(12) United States Patent
Desserrey et al.

(10) Patent No.: US 12,056,332 B2
(45) Date of Patent: Aug. 6, 2024

(54) CHAT INTERFACE WITH DYNAMICALLY POPULATED MENU ELEMENT

(71) Applicant: Snap Inc., Santa Monica, CA (US)

(72) Inventors: Laurent Desserrey, Los Angeles, CA (US); Dylan Shane Eirinberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/305,978

(22) Filed: Jul. 19, 2021

(65) Prior Publication Data

US 2022/0201116 A1 Jun. 23, 2022

Related U.S. Application Data

(60) Provisional application No. 63/130,260, filed on Dec. 23, 2020.

(51) Int. Cl.
*G06F 3/0483* (2013.01)
*G06F 3/04817* (2022.01)
(Continued)

(52) U.S. Cl.
CPC ........ *G06F 3/0483* (2013.01); *G06F 3/04817* (2013.01); *G06F 3/0482* (2013.01);
(Continued)

(58) Field of Classification Search
CPC .. G06F 3/0483; G06F 3/04817; G06F 3/0482; G06F 3/0488; G06F 3/04886;
(Continued)

(56) References Cited

U.S. PATENT DOCUMENTS

| | | | |
|---|---|---|---|
| 10,348,658 B2 * | 7/2019 | Rodriguez | .......... H04L 65/1069 |
| 10,404,636 B2 * | 9/2019 | Rodriguez | .............. H04L 51/04 |

(Continued)

FOREIGN PATENT DOCUMENTS

WO    WO-2022140131 A1    6/2022

OTHER PUBLICATIONS

"International Application Serial No. PCT/US2021/063585, International Search Report mailed Mar. 30, 2022", 4 pgs.

(Continued)

*Primary Examiner* — Benjamin Smith
(74) *Attorney, Agent, or Firm* — Schwegman Lundberg & Woessner, P.A.

(57) ABSTRACT

The disclosed system provides a chat interface with a dynamically populated menu element. According to certain example embodiments, a dynamic menu system may perform operations that include: presenting a set of identifiers at a client device; receiving an input that selects an identifier from among the set of identifiers; causing display of a chat interface in response to the input that selects the identifier, the chat interface including a menu element at a position within the chat interface, the menu element comprising a display of a set of tabs that correspond with application categories; receiving a selection of a tab from among the set of tabs, the tab corresponding with an application category; curating a set of applications based on the application category of the tab; and causing display of a presentation of the set of applications within the chat interface.

15 Claims, 12 Drawing Sheets

(51) Int. Cl.
  *G06F 3/0482*  (2013.01)
  *G06F 3/0488*  (2022.01)
  *H04M 1/72439* (2021.01)

(52) U.S. Cl.
  CPC ...... *G06F 3/0488* (2013.01); *H04M 1/72439* (2021.01); *H04M 2201/42* (2013.01)

(58) Field of Classification Search
  CPC .. G06F 16/9537; G06F 16/387; G06F 16/487; G06F 16/587; G06F 16/687; G06F 16/787; G06F 16/909; H04M 1/72472; H04M 1/72403; H04M 2201/42; H04M 1/7243–72439; H04M 1/72457; H04M 3/42348; H04L 51/04–046; H04L 51/32; H04L 51/52; H04L 67/52; H04L 51/222; A63F 13/87
  See application file for complete search history.

(56) References Cited

U.S. PATENT DOCUMENTS

| | | | | |
|---|---|---|---|---|
| 10,880,243 | B2* | 12/2020 | Rodriguez | H04L 51/046 |
| 11,050,694 | B2* | 6/2021 | Rodriguez | H04L 51/10 |
| 11,381,874 | B2* | 7/2022 | Richman | G06F 3/04842 |
| 2006/0121986 | A1* | 6/2006 | Pelkey | A63F 13/795 |
| | | | | 463/40 |
| 2010/0070758 | A1* | 3/2010 | Low | H04L 9/40 |
| | | | | 709/204 |
| 2011/0197143 | A1* | 8/2011 | Baszucki | A63F 13/79 |
| | | | | 715/745 |
| 2011/0250971 | A1* | 10/2011 | van os | A63F 13/85 |
| | | | | 463/43 |
| 2012/0178536 | A1* | 7/2012 | Oh | H04L 51/046 |
| | | | | 463/42 |
| 2012/0214505 | A1* | 8/2012 | Kaido | A63F 13/79 |
| | | | | 455/456.1 |
| 2013/0191397 | A1* | 7/2013 | Avadhanam | G06F 16/24578 |
| | | | | 707/E17.084 |
| 2013/0326011 | A1* | 12/2013 | Mizuki | H04L 67/75 |
| | | | | 709/217 |
| 2014/0179425 | A1* | 6/2014 | Perry | A63F 13/86 |
| | | | | 463/31 |
| 2016/0234135 | A1 | 8/2016 | Kim | |
| 2016/0279523 | A1* | 9/2016 | Altagar | A63F 13/2145 |
| 2018/0063276 | A1 | 3/2018 | Foged | |
| 2018/0367483 | A1* | 12/2018 | Rodriguez | H04L 51/046 |
| 2018/0367484 | A1* | 12/2018 | Rodriguez | H04L 51/10 |
| 2019/0036989 | A1* | 1/2019 | Eirinberg | H04L 63/102 |
| 2019/0297039 | A1* | 9/2019 | Rodriguez | H04L 67/75 |
| 2019/0394147 | A1* | 12/2019 | Rodriguez | H04L 51/046 |
| 2020/0067867 | A1 | 2/2020 | Tal et al. | |
| 2020/0213442 | A1* | 7/2020 | Tan | H04M 1/72469 |
| 2021/0152503 | A1* | 5/2021 | Rodriguez | H04L 51/04 |

OTHER PUBLICATIONS

"International Application Serial No. PCT/US2021/063585, Written Opinion mailed Mar. 30, 2022", 7 pgs.

"International Application Serial No. PCT/US2021/063585, International Preliminary Report on Patentability mailed Jul. 6, 2023", 9 pgs.

* cited by examiner

CHAT INTERFACE WITH DYNAMICALLY POPULATED MENU ELEMENT

CLAIM OF PRIORITY

This application claims the benefit of priority to U.S. Provisional Application Ser. No. 63/130,260, filed Dec. 23, 2020, which is incorporated herein by reference in its entirety

BACKGROUND

The popularity and convenience of mobile devices as well as the widespread of use of wireless communications have caused communications between user devices to become ubiquitous. Users commonly use their devices to send electronic messages to other users as text messages, chat messages, as well as email. For example, users engaged in a chat session may post text, images, and other types of media via a chat interface, and the posted media is displayed in the chat interfaces displayed on the other user devices participating in the chat conversation.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
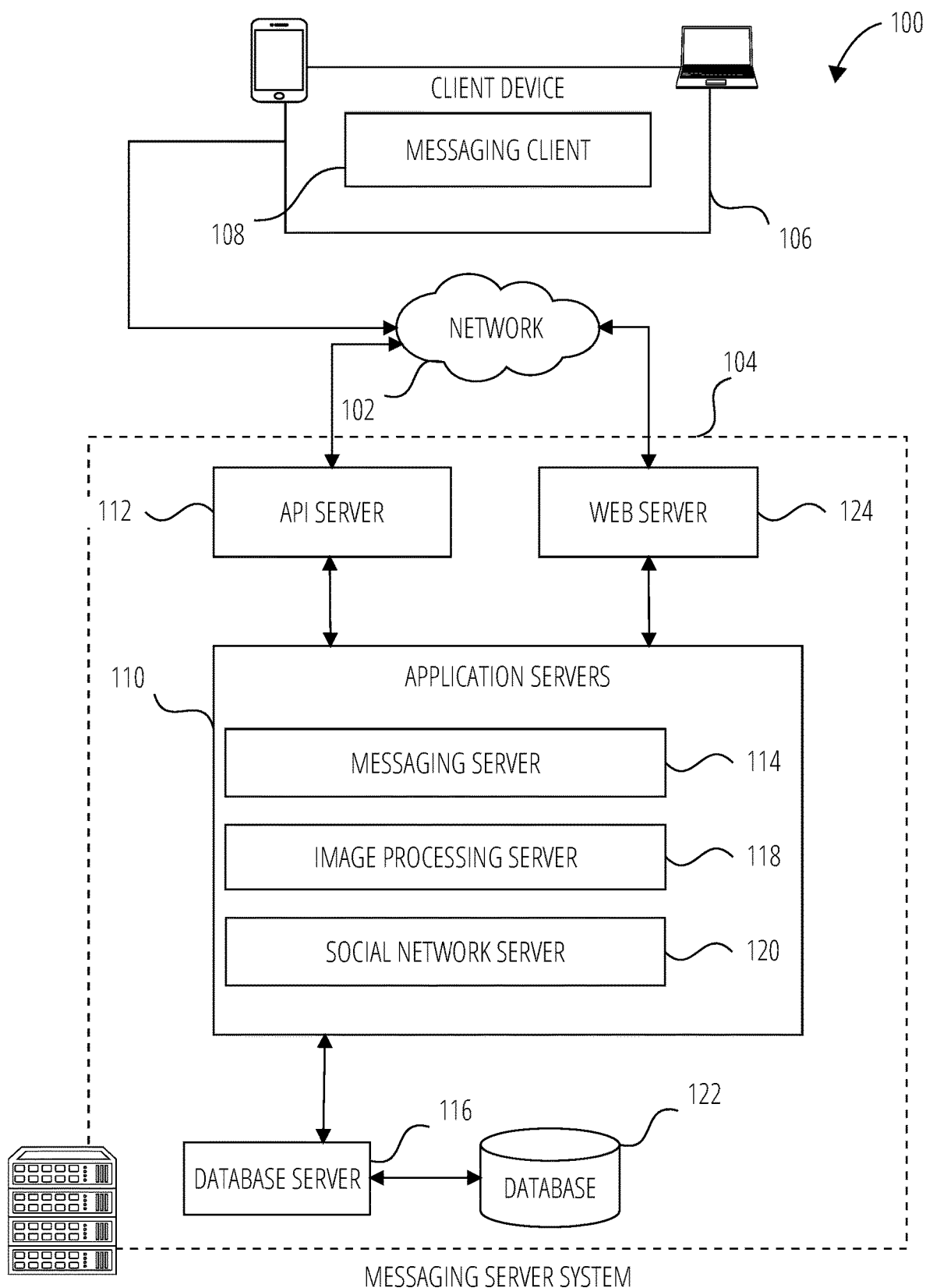
FIG. 1 is a diagrammatic representation of a networked environment in which the present disclosure may be deployed, in accordance with some examples.

The disclosed system provides a chat interface with a dynamically populated menu element. According to certain example embodiments, a dynamic menu system may perform operations that include: presenting a set of identifiers at a client device; receiving an input that selects an identifier from among the set of identifiers; causing display of a chat interface in response to the input that selects the identifier, the chat interface including a menu element at a position within the chat interface, the menu element comprising a display of a set of tabs that correspond with application categories; receiving a selection of a tab from among the set of tabs, the tab corresponding with an application category; curating a set of applications based on the application category of the tab; and causing display of a presentation of the set of applications within the chat interface.

In some embodiments, the set of applications associated with the application category of the tab may be curated based on factors that include user profile data of a user associated with the client device, as well as user profile data associated with the identifier selected by the input. The user profile data may for example include an application usage history, as well as user preferences. Responsive to receiving the input that selects the tab from the client device, a dynamic menu system may access a collection of applications associated with the application category of the tab, and curate a set of applications from among the collection of applications based on the user profile data.

In some embodiments, a user of the client device may select an application from among the set of applications presented within the chat interface. Responsive to receiving a selection of an application from among the set of applications, certain embodiments of the dynamic menu system may update a user profile status associated with a user of the client device based on the selected application. For example, the application may include a game. Responsive to the selection of the game, the dynamic menu system may update the user profile status to include a text string indicating that the user is playing the selected game, or an icon corresponding with the game.

In some embodiments, responsive to receiving the selection of the application from among the set of applications, the dynamic menu system may generate a notification that identifies the application, and present the notification within the chat interface. For example, the dynamic menu system may generate a message that includes the notification, and delivery the message to a user account associated with the identifier selected by the user. In doing so, the notification may then be presented within the chat interface where the user engaged in the chat session may further interact with the notification by providing input to select the notification. In certain embodiments, selection of the notification may launch the application associated with the notification.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
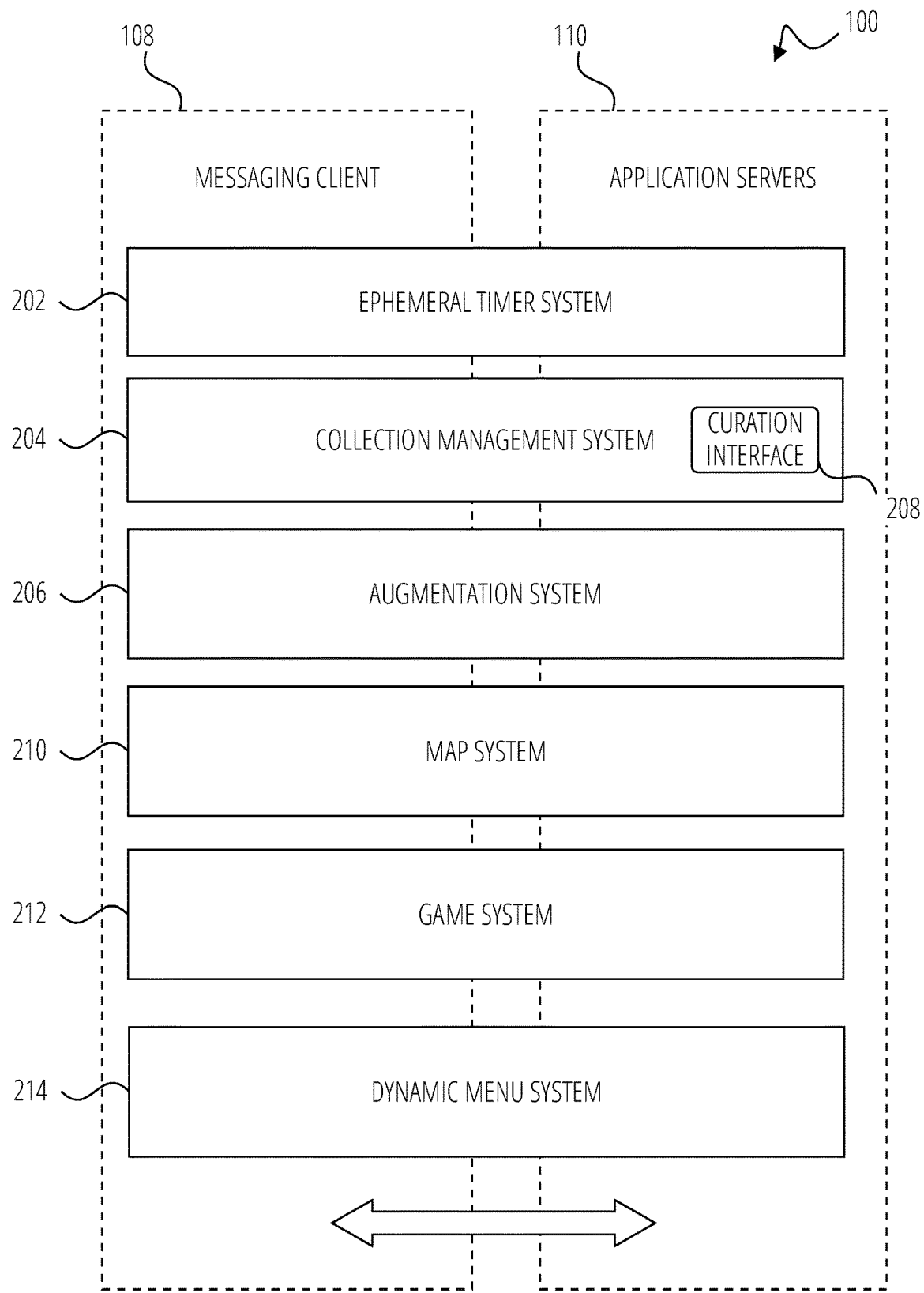
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a Dynamic menu system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The dynamic menu system 214 provides functions related to generating and dynamically updating contents of a menu elements based on one or more factors, according to certain example embodiments.

Figure 3:
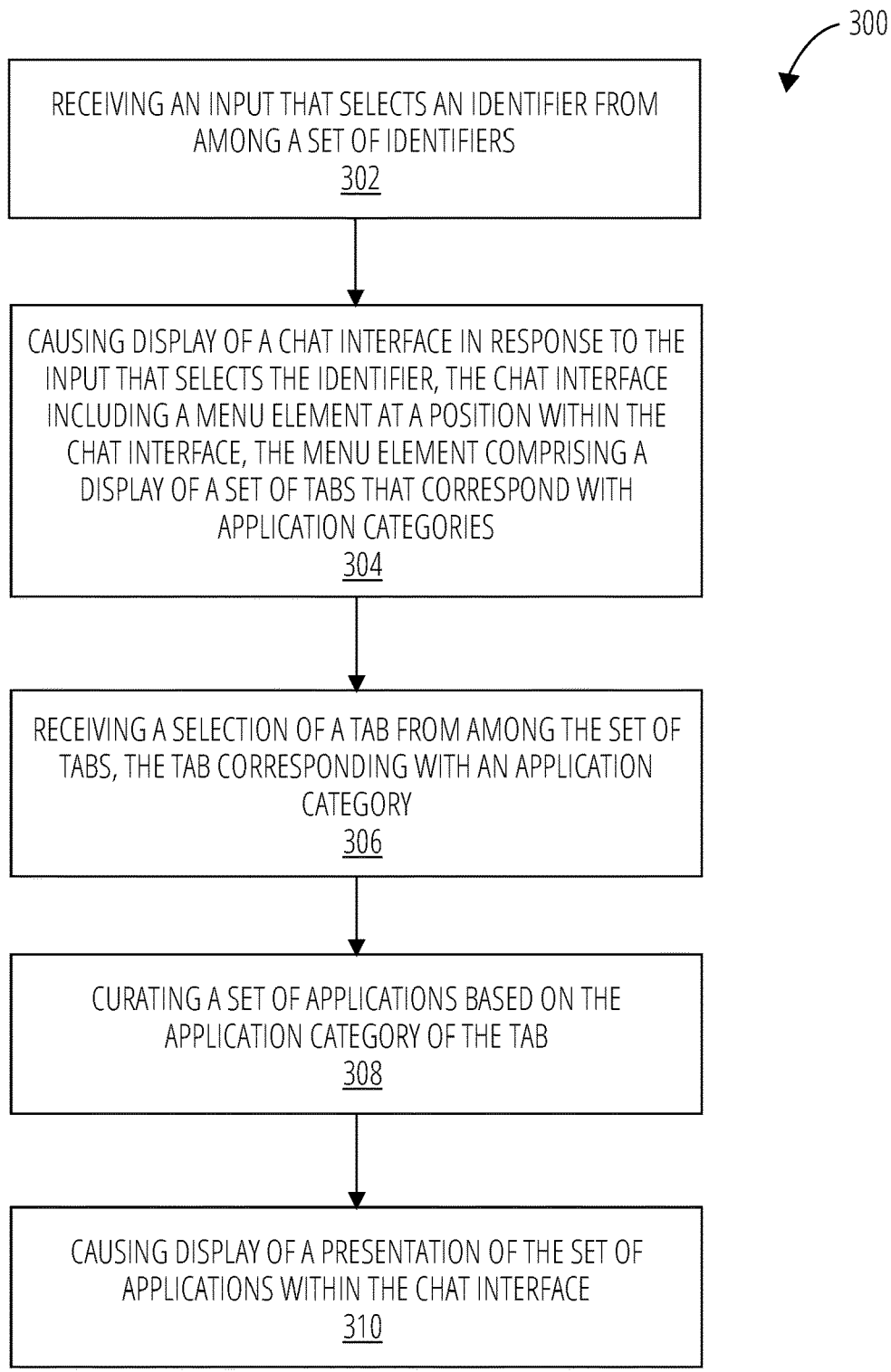
FIG. 3 is a flowchart depicting a method 300 for dynamically populating contents presented within a menu element, in accordance with one embodiment.

FIG. 3 is a flowchart illustrating operations of a dynamic menu system 214 in performing a method 300 for dynamically populating contents presented within a menu element, according to certain example embodiments. Operations of the method 300 may be performed by one or more subsystems of the messaging system 100 described above with respect to FIG. 2, such as the dynamic menu system 214. As shown in FIG. 3, the method 300 includes one or more operations, 302, 304, 306, 308, and 310.

At operation 302, the dynamic menu system 214 receives an input that selects an identifier from among a set of identifiers. The identifier may include a user identifier, or group identifier that corresponds with a user group that comprises a plurality of user identifiers.

At operation 304, the dynamic menu system 214 causes display of a chat interface in response to the input that selects the identifier, wherein the chat interface includes a menu element at a position within the chat interface, and wherein the menu element comprises a display of a set of tabs that each correspond with an application category from among a set of application categories.

Figure 8:
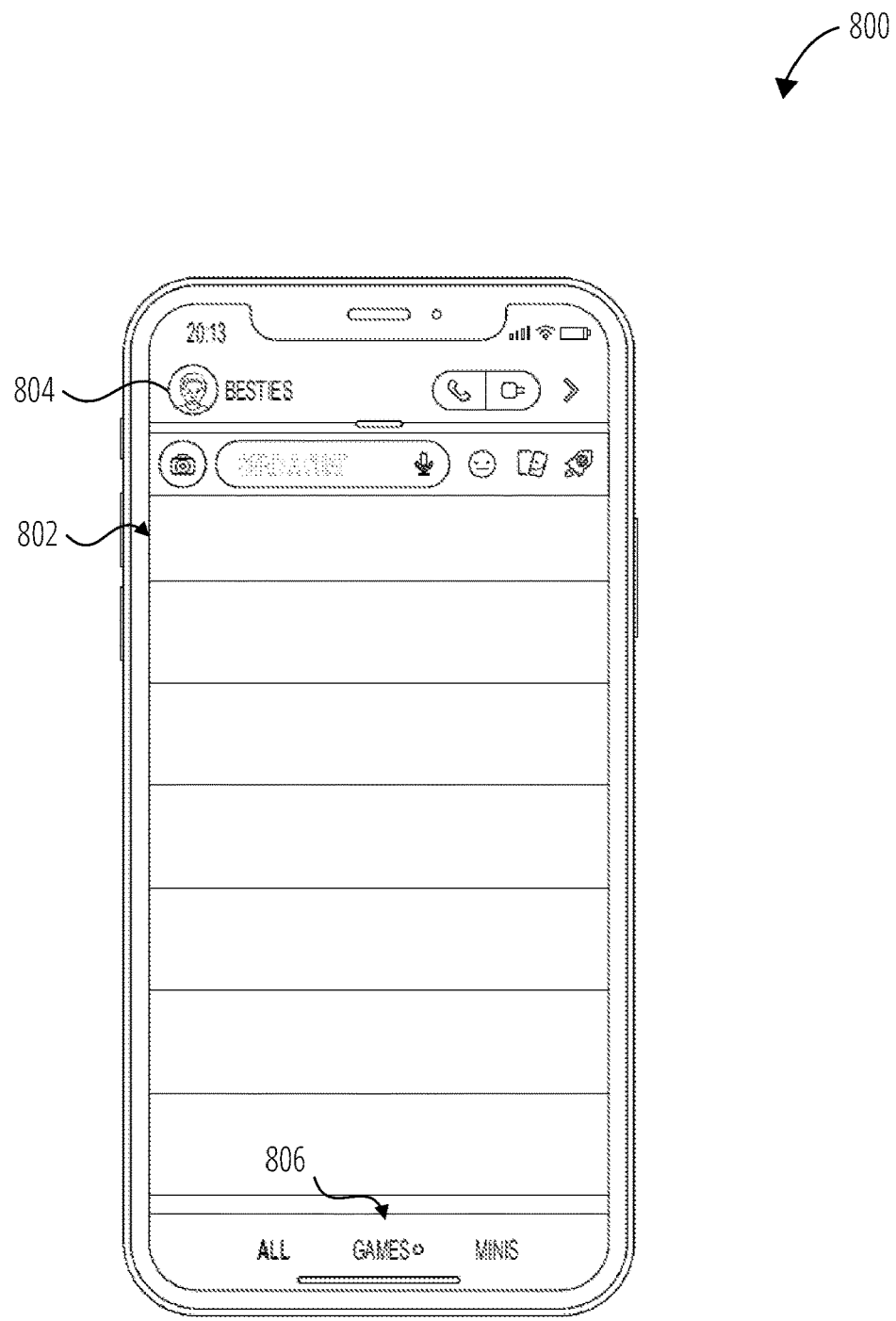
FIG. 8 is an interface diagram depicting a chat interface, in accordance with one embodiment.

For example, as illustrated in FIG. 8, the chat interface 802 may be presented within an interface of a client device 106 responsive to an input that selects an identifier 804, from among a set of identifiers. Accordingly, as seen in FIG. 8, the set of tabs 806 may be presented at a position within the chat interface 802, and may comprise a display of the corresponding application category (i.e., ALL, GAMES, MINIS).

At operation 306, the dynamic menu system 214 receives a selection of a tab from among the set of tabs (i.e., the set of tabs 806), wherein the tab corresponds with an application category. The selection may for example include a tactile input that selects a tab from among the set of tabs 806.

Figure 4:
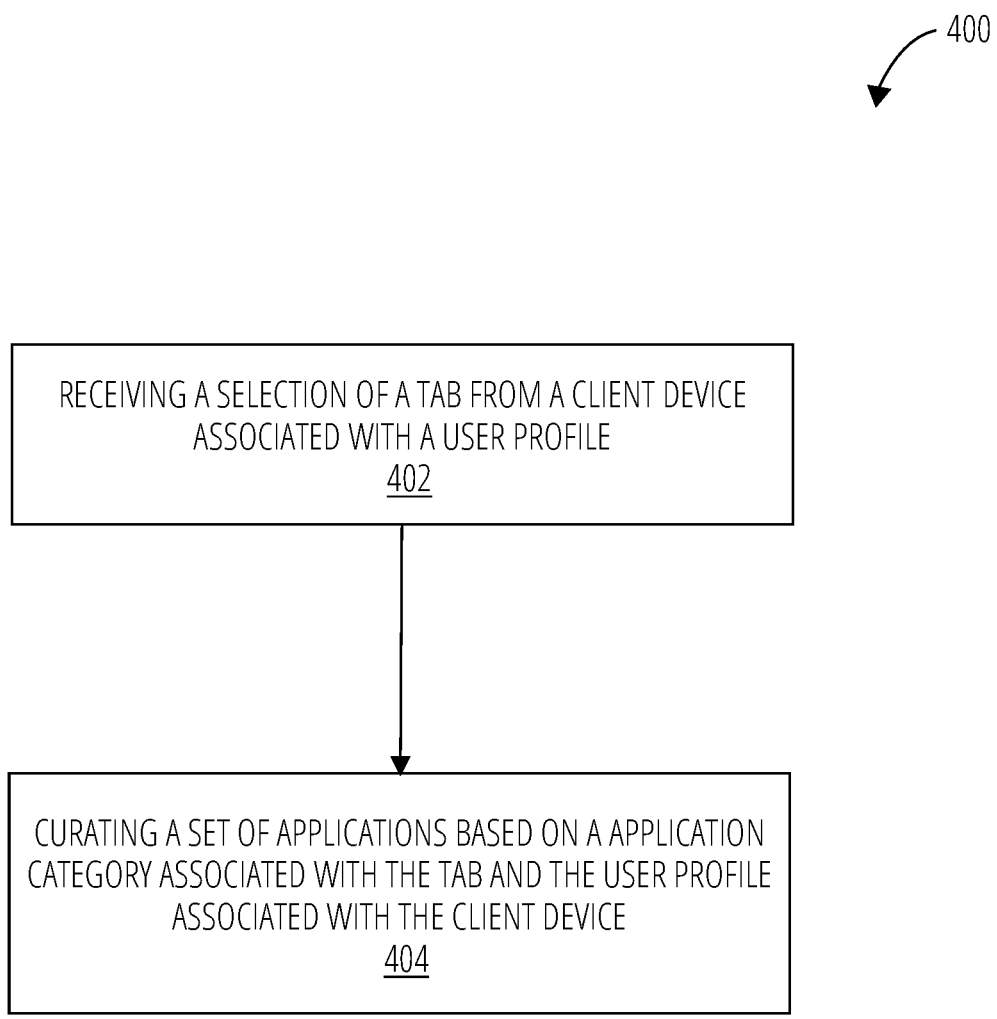
FIG. 4 is a flowchart depicting a method 400 for dynamically populating contents presented within a menu element, in accordance with one embodiment.

At operation 308, the dynamic menu system 214 curates a set of menu options that may for example include a set of applications from among a collection of applications associated with the category of the selected tab, and at operation 310, causes display of a presentation of the set of applications within the chat interface (i.e., the chat interface 802). FIG. 4 provides further details on factors which may be taken account in dynamically curating a set of menu options.

FIG. 4 is a flowchart illustrating operations of a dynamic menu system 214 in performing a method 400 for dynamically populating contents presented within a menu element, according to certain example embodiments. Operations of the method 400 may be performed by one or more subsystems of the messaging system 100 described above with respect to FIG. 2, such as the dynamic menu system 214. As shown in FIG. 4, the method 400 includes one or more operations 402, and 404 which may be performed as a subroutine of the method 300.

At operation 402, the dynamic menu system 214 receives a selection of a tab from the client device 106, wherein the client device 106 is associated with a user profile. The user profile may comprise user profile data that includes user preferences, as well as an application usage history indicating a number of times that a user has executed each application from among the collections of applications.

At operation 404, the dynamic menu system 214 curates a set of applications from among a collection of applications associated with the application category that corresponds with the selected tab based on the user profile data. Accordingly, icons or identifiers associated with the applications from the set of applications may be ranked and displayed within the chat interface. User profile data may for example include a usage history associated with a portion of the collection of applications (i.e., amount of time spent In some embodiments, the dynamic menu system 214 may curate the set of applications based on user profile data as well as context information associated with the client device 106. For example, the context information may include location data indicating a location of the client device, temporal data, indicating a time of day, as well as local weather conditions. Accordingly, in such embodiments, the dynamic menu system 214 may access a repository from among a plurality of repositories, such as the database 122, or a memory of the client device 106, wherein the repository contains a plurality of application identifiers, and wherein each application identifier among the plurality of application identifiers are associated with one or more contextual conditions. In some embodiments, the dynamic menu system 214 may select a repository from among the plurality of repositories based on the user profile data, the category associated with the tab, and contextual conditions. For example, the dynamic menu system 214 may determine a contextual condition, and then, based on one or more of the determined contextual condition and the user profile data, may select a repository from among a plurality of repositories in order to identify the set of applications.

In some embodiments, the dynamic menu system 214 may curate the set of applications based on the user profile data of the user, as well as user profile data associated with the one or more users that correspond with the selected identifier, as discussed in operation 302 of the method 300.

Figure 5:
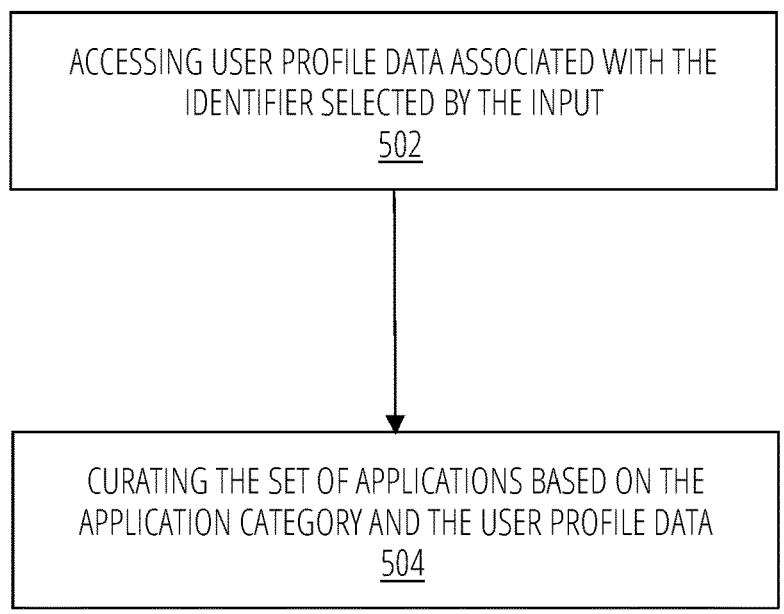
FIG. 5 is a flowchart depicting a method 500 for dynamically populating contents presented within a menu element, in accordance with one embodiment.

FIG. 5 is a flowchart illustrating operations of a dynamic menu system 214 in performing a method 500 for dynamically populating contents presented within a menu element, according to certain example embodiments. Operations of the method 500 may be performed by one or more subsystems of the messaging system 100 described above with respect to FIG. 2, such as the dynamic menu system 214. As shown in FIG. 5, the method 500 includes one or more operations 502, and 504, that may be performed as a subroutine of the method 300.

At operation 502, responsive to receiving the selection of the identifier, as in operation 302 of the method 300, the dynamic menu system 214 accesses a user profile associated with the identifier, wherein the user profile comprises user profile data that includes user preferences, as well as an application usage history indicating a number of times that the user associated with the identifier has executed each application from among the collections of applications.

At operation 504, the dynamic menu system 214 curates a set of applications from among a collection of applications associated with the application category that corresponds with the selected tab based on the user profile data associated with the user profile that corresponds with the identifier. Accordingly, icons or identifiers associated with the applications from the set of applications may be ranked and displayed within the chat interface.

For example, the icons or identifiers associated with the applications may be ranked based on one or more of: the application usage history of the user; a popularity score associated with each of the applications, wherein the popularity score is based on a number of active users executing each of the applications, or a number of times that the application has been selected by a user; as well as one or more contextual conditions.

Figure 6:
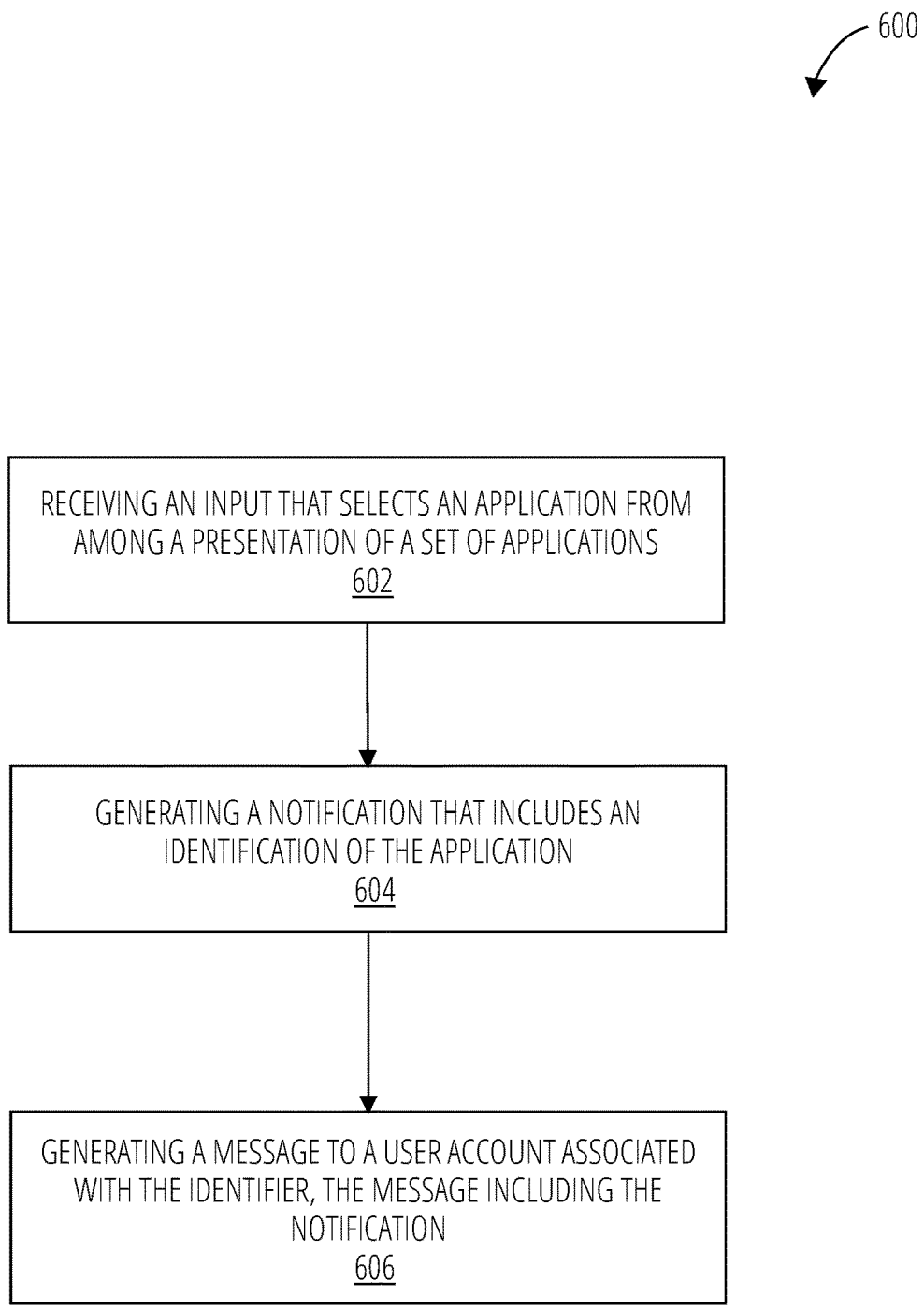
FIG. 6 is a flowchart depicting a method 600 for generating a message, in accordance with one embodiment.

FIG. 6 is a flowchart illustrating operations of a dynamic menu system 214 in performing a method 600 for generating a message, according to certain example embodiments. Operations of the method 600 may be performed by one or more subsystems of the messaging system 100 described above with respect to FIG. 2, such as the Dynamic menu system 214. As shown in FIG. 6, the method 600 includes one or more operations 602, 604, and 606, that may be performed as a subroutine of the method 300.

At operation 602, the dynamic menu system 214 receives an input that selects an application from among a presentation of the set of applications. For example, a user of the client device 106 may provide an input that selects an icon or identifier associated with the application from the presentation of the set of applications presented within a menu element of the chat interface.

At operation 604, the dynamic menu system 214 generates a notification that includes an identification of the application. For example, the notification may include a display of an identifier or icon associated with the selected application.

At operation 606, the dynamic menu system 214 generates a message to a user account identified by the identifier, wherein the message includes the notification.

Figure 7:
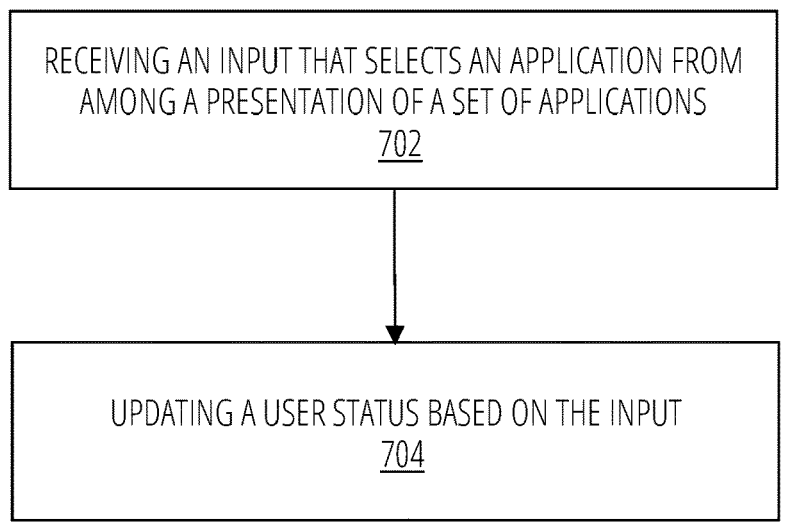
FIG. 7 is a flowchart depicting a method 700 for presenting a user status based on a selection, in accordance with one embodiment.

FIG. 7 is a flowchart illustrating operations of a dynamic menu system 214 in performing a method 600 for updating a user status, according to certain example embodiments. Operations of the method 700 may be performed by one or more subsystems of the messaging system 100 described above with respect to FIG. 2, such as the dynamic menu system 214. As shown in FIG. 7, the method 700 includes one or more operations 702, and 704 that may be performed as a subroutine of the method 300.

At operation 702, the dynamic menu system 214 receives an input that selects an application from among a presentation of the set of applications. For example, a user of the client device 106 may provide an input that selects an icon or identifier associated with the application from the presentation of the set of applications presented within a menu element of the chat interface.

At operation 704, the dynamic menu system 214 updates a user status associated with a user profile of the user based on the input. For example, the user status may include an indication of the selected application, such as an identifier, or icon that corresponds with the application. Accordingly, the user status associated with the user profile of the user may be presented or otherwise displayed to other users.

For example, a user status of a first user may be updated to indicate that the first user is engaged in a gaming session associated with an application. A second user, wherein the second user may be a user connection of the first user, may be presented with the user status of the first user responsive to receiving an input from the second user that selects or otherwise identifies the first user. In further embodiments, the user status of the first user may be presented to the second user as an icon displayed proximate to an identifier of the first user among a list of user connections displayed at a client device associated with the second user.

FIG. 8 is an interface diagram 800 depicting a chat interface presented by the dynamic menu system 214, according to certain example embodiments. As illustrated in FIG. 8, the chat interface 802 may be presented within an interface of a client device 106 responsive to an input that selects an identifier 804, from among a set of identifiers. Accordingly, as seen in FIG. 8, the set of tabs 806 may be presented at a position within the chat interface 802, and may comprise a display of the corresponding application category (i.e., ALL, GAMES, MINIS).

In some embodiments, the identifier 804 may correspond with an individual user, or with a user group that comprises a grouping of users that may be defined by a user of the client device 106. For example, in some embodiments, a user may provide an input that selects one or more user identifiers, and allocates them to a user group, wherein an identifier associated with the user group, such as the identifier 804, may be defined by the user.

In some embodiments, the identifier 804 may be presented to the user among a list of user identifiers. A user of the client device 106 may provide an input that selects a display of the identifier from among the list of user identifiers, and in response, the dynamic menu system 214 may cause display of the chat interface 802, wherein the chat interface 802 may comprise a listing of messages and messaging sessions associated with the selected identifier.

Figure 9:
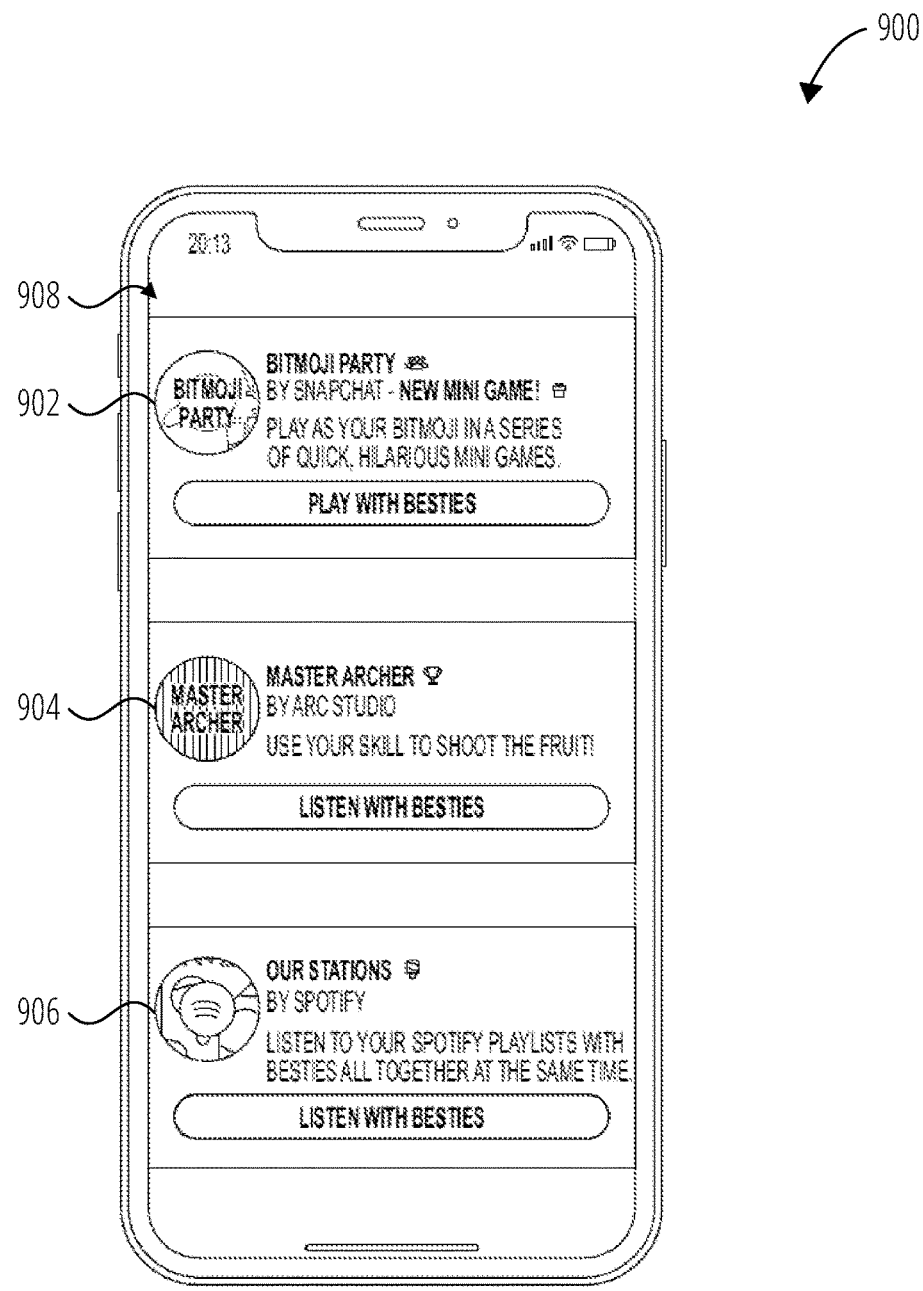
FIG. 9 is an interface diagram depicting a set of icons that may be presented in a dynamically populated menu element, in accordance with one embodiment.

FIG. 9 is an interface diagram 900 depicting various icons that may be presented by the dynamic menu system 214 within a chat interface, such as the chat interface 802, according to certain example embodiments. As seen in the interface diagram 900, the icons (such as icon 902, icon 904, and icon 906) may comprise a display of an identifier that identifies an application that corresponds with the icon.

In some embodiments, the icons, such as those depicted in the interface diagram 900, may be presented within a menu element of the chat interface 802, such as the menu element 908. For example, as discussed in the method 300, responsive to receiving a selection of a tab from among the set of tabs 806 depicted in FIG. 8, the dynamic menu system 214 curates a set of applications to be presented at the client device 106 within the menu element 908. In certain example embodiments, the set of applications may be curated from among a collection of applications based on: user profile data of a user associated with the client device 106; user profile data associated with the one or more users associated with a selected identifier (i.e., the identifier 804 depicted in FIG. 8); contextual considerations that include location data generated by the client device 106, as well as temporal data; and a user context, wherein the user context include a session state of a user of the client device 106.

As seen in FIG. 9, the dynamic menu system 214 may present the curated set of applications as icons, such as the icons 902, 904, and 906, within the menu element 908. In some embodiments, a display of the icons that represent the applications may be presented in a sort order, wherein the sort order is based on one or more factors, such as: user profile data of a user of the client device 106; user profile data associated with the one or more users that correspond with the selected identifier; contextual data; location data; and temporal data.

In some embodiments, responsive to receiving an input that selects an application from among the set of applications presented in the menu element 908, the dynamic menu system 214 may generate and cause display of a notification to the one or more users that correspond with the selected identifier, wherein the notification comprises a display of an identifier of the selected application. Accordingly, a recipient of the notification may provide an input that selects the notification, and in response, may cause the dynamic menu system 214 to execute the selected application at a corresponding device of the user.

In some embodiments, execution of an application may cause the dynamic menu system 214 to notify the one or more users associated with the user group identified by the selected identifier that a user among the user group has executed the application.

Machine Architecture

Figure 10:
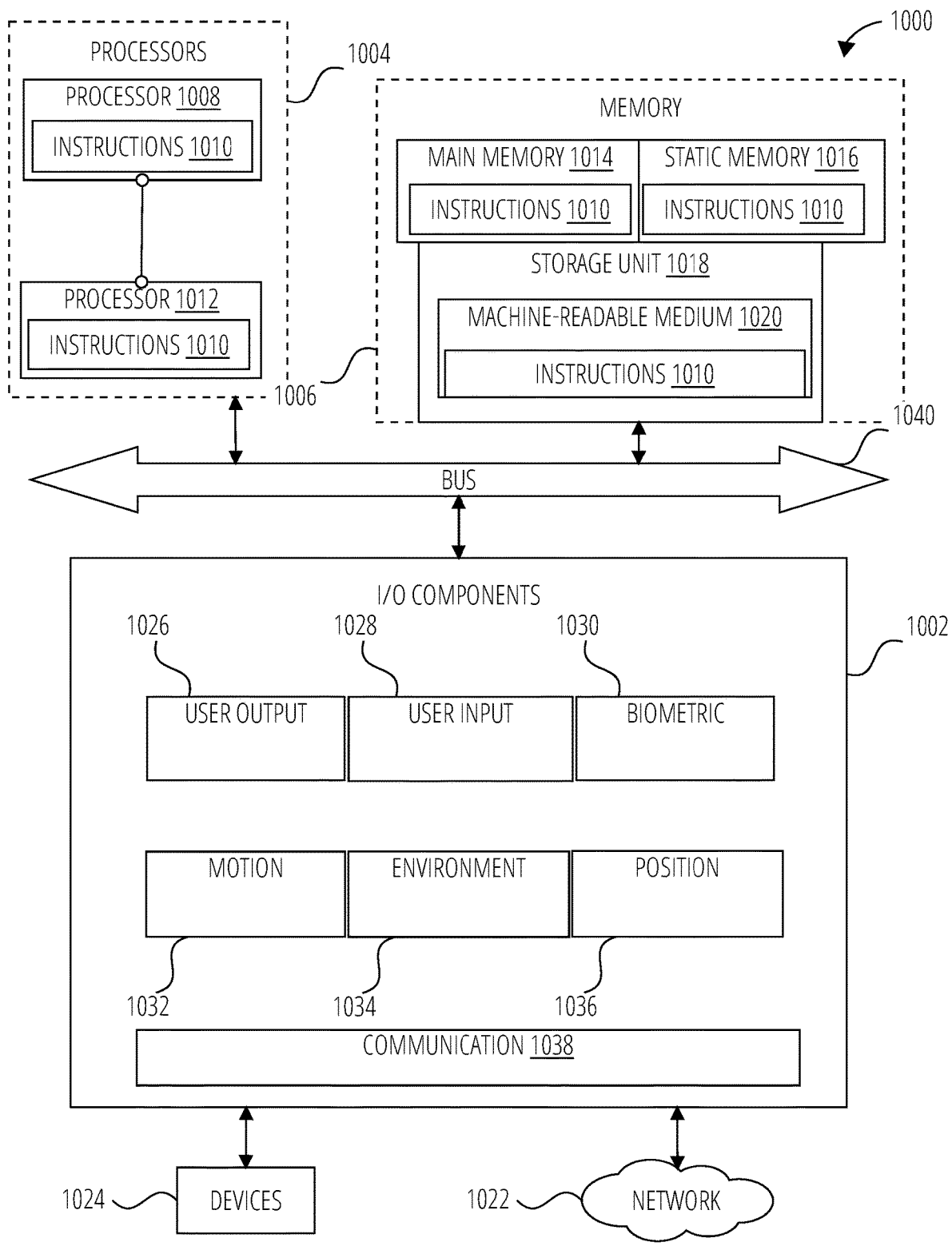
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 106 or any one of a number of server devices forming part of the messaging server system 104. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 638, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
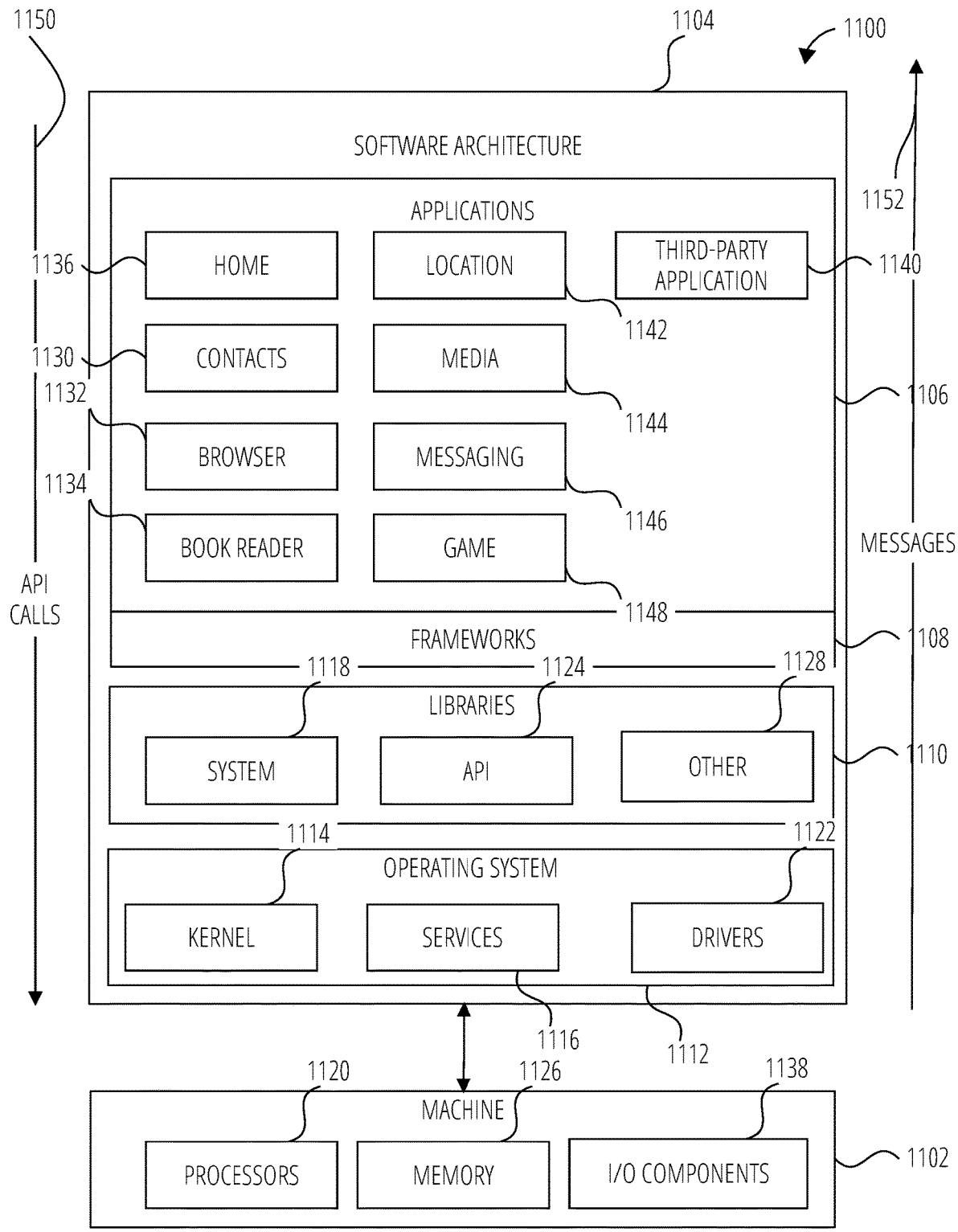
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Processing Components

Figure 12:
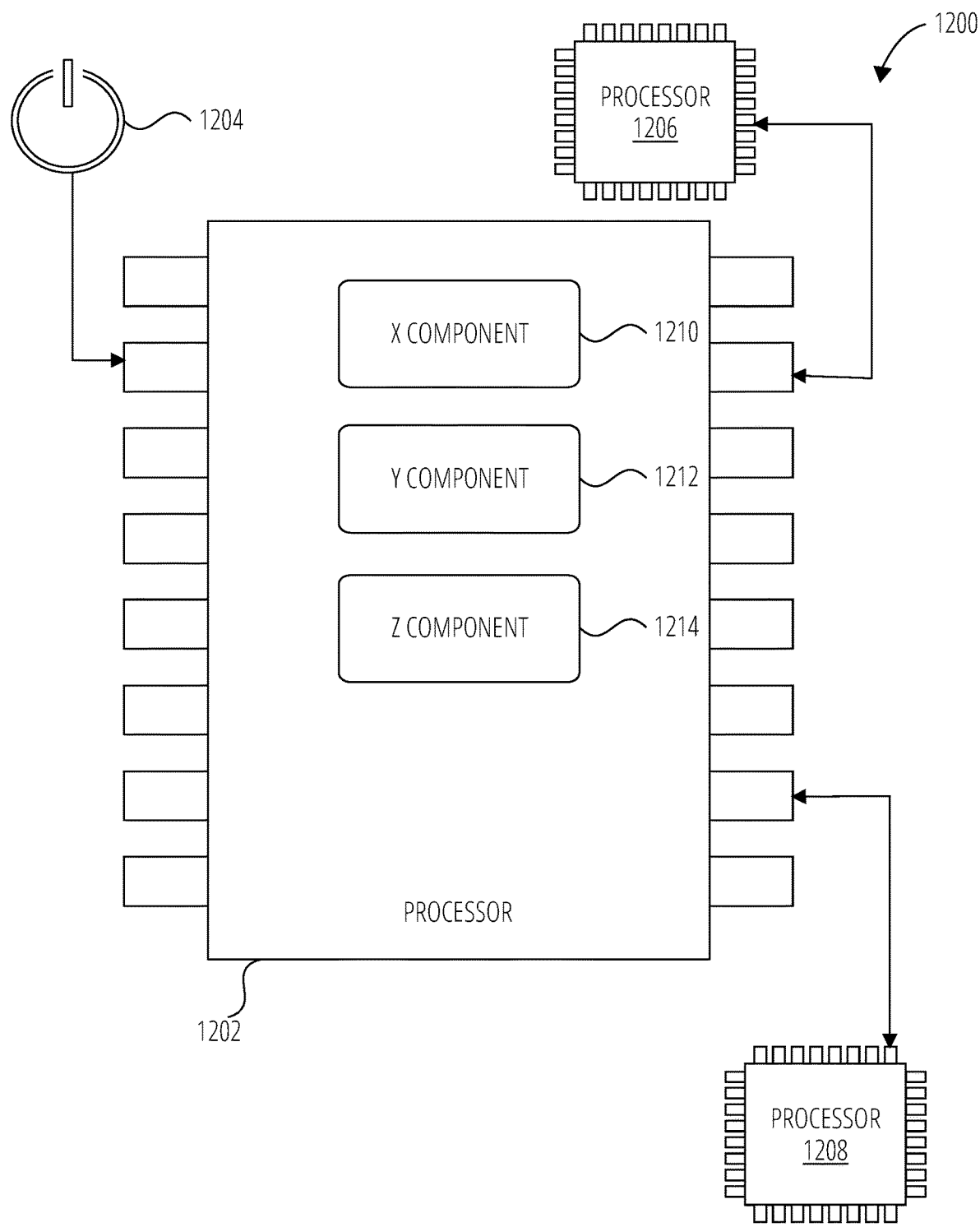
FIG. 12 is a diagrammatic representation of a processing environment, in accordance with some examples.

Turning now to FIG. 12, there is shown a diagrammatic representation of a processing environment 1200, which includes a processor 1202, a processor 1206, and a processor 1208 (e.g., a GPU, CPU or combination thereof).

The processor 1202 is shown to be coupled to a power source 1204, and to include (either permanently configured or temporarily instantiated) modules, namely an X component 1210, a Y component 1212, and a Z component 1214. The X component 1210 operationally receives inputs from a client device, such as the client device 106, the Y component 1212 operationally curates a set of applications from among a collection of applications, and the Z component 1214 operationally generates and causes display of a presentation of the set of applications. As illustrated, the processor 1202 is communicatively coupled to both the processor 1206 and the processor 1208.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is provisionally claimed is:

1. A method comprising:
   receiving, from a client device, an identification of a user identifier from among a set of user identifiers;
   causing display of a chat interface at a client device in response to the identification of the user identifier, the chat interface including a menu element at a position within the chat interface, the menu element comprising a display of a set of tabs that correspond with a set of application categories, the set of application categories comprising a plurality of application categories;
   receiving a selection of a tab from among the set of tabs, the tab corresponding with an application category from among the set of application categories;
   curating a set of applications based on the application category of the tab and context information associated with the client device, the set of applications comprising a plurality of applications, and the context information including location data associated with the client device;
   determining a ranking of the set of applications based on one or more ranking criteria, the one or more ranking criteria including a score associated with each application among the set of applications, the score based on a number of active users executing each application among the set of applications;
   causing display of a presentation of the set of applications within the chat interface based on the ranking, the presentation of the set of applications comprising a plurality of icons that include identifiers associated with each application among the set of applications;
   receiving an input that selects an icon from among the plurality of icons, the icon corresponding with an application that comprises an identifier; and
   causing display of a notification within the chat interface, the notification including a display of the identifier of the application, and configured to launch the application identified by the identifier based on an interactive input that selects the notification.

2. The method of claim 1, wherein the receiving the selection of the tab includes:
   receiving the selection of the tab from the client device associated with a user profile; and
   wherein the curating the set of applications includes curating the set of applications based on the application category and the user profile associated with the client device.

3. The method of claim 1, wherein the curating the set of applications further comprises:
   accessing user profile data associated with the identifier selected by the input; and
   curating the set of applications based on the application category, the context information, and the user profile data, the user profile data including an application usage history.

4. The method of claim 1, further comprising:
updating a user status based on the identifier of the application.

5. The method of claim 1, wherein the curating the set of applications based on the application category of the tab includes:
accessing a collection of applications associated with the application category; and
curating the set of applications from the collection of applications.

6. A system comprising:
one or more hardware processors; and
a computer-readable medium coupled with the one or more hardware processors, the computer-readable medium comprising instructions stored thereon that are executable by the one or more hardware processors to cause the computing device to perform operations comprising:
receiving, from a client device, an identification of a user identifier from among a set of user identifiers;
causing display of a chat interface at a client device in response to the identification of the user identifier, the chat interface including a menu element at a position within the chat interface, the menu element comprising a display of a set of tabs that correspond with a set of application categories, the set of application categories comprising a plurality of application categories;
receiving a selection of a tab from among the set of tabs, the tab corresponding with an application category from among the set of application categories;
curating a set of applications based on the application category of the tab and context information associated with the client device, the set of applications comprising a plurality of applications, and the context information including location data associated with the client device;
determining a ranking of the set of applications based on one or more ranking criteria, the one or more ranking criteria including a score associated with each application among the set of applications, the score based on a number of active users executing each application among the set of applications;
causing display of a presentation of the set of applications within the chat interface based on the ranking, the presentation of the set of applications comprising a plurality of icons that include identifiers associated with each application among the set of applications;
receiving an input that selects an icon from among the plurality of icons, the icon corresponding with an application that comprises an identifier; and
causing display of a notification within the chat interface, the notification including a display of the identifier of the application, and configured to launch the application identified by the identifier based on an interactive input that selects the notification.

7. The system of claim 6, wherein the receiving the selection of the tab includes:
receiving the selection of the tab from the client device associated with a user profile; and
wherein the curating the set of applications includes curating the set of applications based on the application category and the user profile associated with the client device.

8. The system of claim 6, wherein the curating the set of applications further comprises:
accessing user profile data associated with the identifier selected by the input; and
curating the set of applications based on the application category, the context information, and the user profile data, the user profile data including an application usage history.

9. The system of claim 6, further comprising:
updating a user status based on the identifier of the application.

10. The system of claim 6, wherein the curating the set of applications based on the application category of the tab includes:
accessing a collection of applications associated with the application category; and
curating the set of applications from the collection of applications.

11. A non-transitory computer-storage medium comprising instructions stored thereon that are executable by at least one processor to cause a computing device to perform operations comprising:
receiving, from a client device, an identification of a user identifier from among a set of user identifiers;
causing display of a chat interface at a client device in response to the identification of the user identifier, the chat interface including a menu element at a position within the chat interface, the menu element comprising a display of a set of tabs that correspond with a set of application categories, the set of application categories comprising a plurality of application categories;
receiving a selection of a tab from among the set of tabs, the tab corresponding with an application category from among the set of application categories;
curating a set of applications based on the application category of the tab and context information associated with the client device, the set of applications comprising a plurality of applications, and the context information including location data associated with the client device;
determining a ranking of the set of applications based on one or more ranking criteria, the one or more ranking criteria including a score associated with each application among the set of applications, the score based on a number of active users executing each application among the set of applications;
causing display of a presentation of the set of applications within the chat interface based on the ranking, the presentation of the set of applications comprising a plurality of icons that include identifiers associated with each application among the set of applications;
receiving an input that selects an icon from among the plurality of icons, the icon corresponding with an application that comprises an identifier; and
causing display of a notification within the chat interface, the notification including a display of the identifier of the application, and configured to launch the application identified by the identifier based on an interactive input that selects the notification.

12. The non-transitory computer-storage medium of claim 11, wherein the receiving the selection of the tab includes:
receiving the selection of the tab from the client device associated with a user profile; and
wherein the curating the set of applications includes curating the set of applications based on the application category and the user profile associated with the client device.

13. The non-transitory computer-storage medium of claim 11, wherein the curating the set of applications further comprises:

accessing user profile data associated with the identifier selected by the input; and curating the set of applications based on the application category, the context information, and the user profile data, the user profile data including an application usage history.

14. The non-transitory computer-storage medium of claim 11, further comprising:

updating a user status based on the identifier of the application.

15. The non-transitory computer-storage medium of claim 11, wherein the curating the set of applications based on the application category of the tab includes:

accessing a collection of applications associated with the application category; and curating the set of applications from the collection of applications.

* * * * *